United States Patent [19]

Ohashi et al.

[11] Patent Number: 5,269,837
[45] Date of Patent: Dec. 14, 1993

[54] EVAPORATION LOSS CONTROL DEVICE

[75] Inventors: Tamiyoshi Ohashi; Masami Mizuno; Sukehiro Sawada; Hisao Hanabusa; Masayuki Nakagawa; Tomohide Aoki, all of Inazawa; Takaaki Ito, Mishima; Yoshihiko Hyodo, Susono; Nobutaka Morimitu, Toyota; Takashi Ohta; Norio Sato, both of Nagoya; Akane Okada, Obu, all of Japan

[73] Assignees: Toyoda Gosei Co., Ltd., Nishikasugai; Toyota Jidosha Kabushiki Kaisha, Toyota; Kabushiki Kaisha Toyota Chuo Kenkyusho, Aichi, all of Japan

[21] Appl. No.: 958,897

[22] Filed: Oct. 9, 1992

[30] Foreign Application Priority Data

Oct. 10, 1991 [JP] Japan .................. 3-290963
Sep. 8, 1992 [JP] Japan .................. 4-265361

[51] Int. Cl.⁵ ............................ B01D 53/04
[52] U.S. Cl. ........................ 96/126; 96/136; 96/144
[58] Field of Search .......... 55/316, 319-322, 55/337, 385.3, 387, 475; 123/518, 519

[56] References Cited

U.S. PATENT DOCUMENTS

| | | | |
|---|---|---|---|
| 3,161,490 | 12/1964 | Dudek | 55/320 X |
| 3,796,025 | 3/1974 | Kasten | 55/316 |
| 3,844,739 | 10/1974 | Alfrey, Jr. | 55/74 |
| 3,876,400 | 4/1975 | Frantz | 55/316 X |
| 4,092,137 | 5/1978 | Howe et al. | 55/337 |
| 4,131,442 | 12/1978 | Frantz | 55/316 X |
| 4,308,840 | 1/1982 | Hiramatsu et al. | 55/387 X |
| 4,381,929 | 5/1983 | Mizuno et al. | 55/387 X |
| 4,386,947 | 6/1983 | Mizuno et al. | 55/387 |
| 4,388,086 | 6/1983 | Bauer et al. | 55/316 X |
| 4,430,099 | 2/1984 | Yanagisawa et al. | 55/316 |
| 4,601,825 | 7/1986 | Eriksson | 210/287 |
| 4,684,382 | 8/1987 | Abu-Isa | 55/316 |
| 4,766,872 | 8/1988 | Kato et al. | 123/519 |
| 4,848,989 | 7/1989 | Maeda | 55/319 |
| 4,946,485 | 8/1990 | Larsson | 55/316 X |
| 4,951,643 | 8/1990 | Sato et al. | 123/519 X |
| 5,002,593 | 3/1991 | Ichishita et al. | 55/316 X |
| 5,061,300 | 10/1991 | Alexander, III | 55/316 X |
| 5,119,791 | 6/1992 | Gifford et al. | 55/387 X |
| 5,173,095 | 12/1992 | Yasukawa et al. | 123/519 X |

FOREIGN PATENT DOCUMENTS

| | | | |
|---|---|---|---|
| 4000845 | 1/1990 | Fed. Rep. of Germany | 55/337 |
| 871853 | 5/1942 | France | 55/322 |
| 56-004652 | 6/1954 | Japan . | |
| 62-218651 | 9/1987 | Japan . | |
| 63-117155 | 5/1988 | Japan . | |
| 63-176650 | 7/1988 | Japan . | |
| 64-67222 | 3/1989 | Japan . | |
| 1-227861 | 9/1989 | Japan . | |
| 2-215959 | 8/1990 | Japan | 123/519 |
| 3-130570 | 6/1991 | Japan . | |

Primary Examiner—Robert Spitzer
Attorney, Agent, or Firm—Cushman, Darby & Cushman

[57] ABSTRACT

An evaporation loss control device provided with a polymer chamber filled with polymer absorbent, a charcoal chamber filled with charcoal, introduction and purging pipes for connecting the polymer chamber with a fuel tank and an engine intake passage, respectively, an air pipe for ventilation connected to the charcoal chamber, and a vapor passage, which has various forms. For example, the vapor passage may be formed in spiral to encircle the polymer chamber, or provided between the polymer and charcoal chambers, thus allowing the evaporated fuel to pass therethrough. The vapor passage is constructed to prevent the evaporated fuel trapped by the polymer absorbent from flowing into the charcoal chamber, and also to prevent the liquid fuel from being absorbed by the charcoal.

11 Claims, 15 Drawing Sheets

EVAPORATION LOSS CONTROL DEVICE

BACKGROUND OF THE INVENTION

1. Field of the Invention

The present invention relates to an evaporation loss control device provided with an automobile fuel tank, such as a canister.

2. Description of the Art

A fairly large amount of fuel evaporates when it is supplied to an automobile fuel tank through a fuel pump nozzle. Part of the fuel in the fuel tank and the carburetor float chamber also evaporates while the automobile is running or at rest.

In order to prevent the leakage of the evaporated fuel into the atmosphere, a canister (evaporation loss control device) filled with a fuel absorbent is attached to, e.g., the fuel tank. The absorbent in the canister serves to trap the evaporated fuel. Similar devices have been employed to trap fuel evaporating or leaking from fuel storage tanks other than those installed on automobiles. In such evaporation loss control devices, charcoal has been used widely as a fuel absorbent.

However, canisters employing the charcoal become less efficient over time to the point where untrapped fuel vapor is released into the atmosphere at undesirable levels. This is because the working capacity of charcoal (i.e., the ability of charcoal to trap gasoline vapor) decreases significantly when the charcoal is in contact with liquid gasoline. Such contact between charcoal and liquid gasoline occurs when the evaporated fuel condenses to reach the charcoal through flowing on the inner surfaces of the piping around the canister or on the charcoal-free space at the top of the canister.

Another reason that canisters became less efficient is that the working capacity decreases when the component of the fuel having a high boiling point is absorbed by charcoal. The component of the fuel with a low boiling point that is absorbed by charcoal, with a number of carbon atoms being less than or equal to 4 or 5, can be easily desorbed when the devices are subjected to purging. On the contrary, the component having the high boiling point of the fuel cannot be easily desorbed.

In order to cope with the above problem, it has been proposed to use polymer absorbent together with charcoal (see Japanese Patent Application (Laid Open) No. 227861/1989, and U.S. Pat. No. 4,684,382) as the absorbent. In such evaporation loss control devices, the absorbent chamber of the known type is divided into two chambers by a cellular partition wall. One of those chambers is filled with charcoal, and the other is filled with polymer absorbent. The working capacity of the charcoal is kept high by using the polymer absorbent which absorbs the component with high boiling point contained in the fuel vapor and the liquid fuel.

In the above prior art (JPA 227861/1989), however, since the polymer chamber is placed close to the charcoal chamber, separated only by the cellular partition, the evaporated fuel absorbed by the polymer absorbent evaporates as time goes by and it is then absorbed by charcoal in the vicinity of the polymer chamber, thus causing the charcoal to decrease its working capacity. In U.S. Pat. No. 4,684,382, the evaporated fuel absorbed by EPDM elastomer foam evaporates to be absorbed by charcoal placed in the vicinity thereof, thus causing the charcoal to decrease its working capacity.

SUMMARY OF THE INVENTION

It is an object of the present invention to provide an evaporation loss control device having an excellent ability to trap evaporated fuel without deteriorating working capacity of the charcoal.

The present invention provides an evaporation loss control device composed of a polymer chamber filled with polymer absorbent, a charcoal chamber filled with charcoal which is communicated with the polymer chamber, an introduction pipe for introducing evaporated fuel by which a fuel tank is communicated with the polymer chamber, a purging pipe for purging the evaporated fuel by which an engine intake passage communicates with the polymer chamber, a pipe for air ventilation provided on the charcoal chamber, and a vapor passage formed between the polymer chamber and charcoal chamber which shuts off a trapped liquid fuel and allows trapped fuel vapor to pass therethrough.

Other features and advantages of this invention will be apparent from the following description and the accompanying drawings.

DETAILED DESCRIPTION OF THE INVENTION

A vapor passage provided in the present invention is designed to allow fuel vapor contained in evaporated fuel admitted into the polymer chamber through the introduction pipe to pass therethrough. The vapor passage is designed so that liquid fuel of the evaporated fuel does not pass therethrough.

The vapor passage may be formed as a spiral provided around the outer periphery of the polymer chamber. Since the spiral passage is provided around the polymer chamber, the distance of the passage becomes substantially long, thus reducing the chances of the vapor fuel reaching the charcoal chamber to a minimum.

Figure 8:
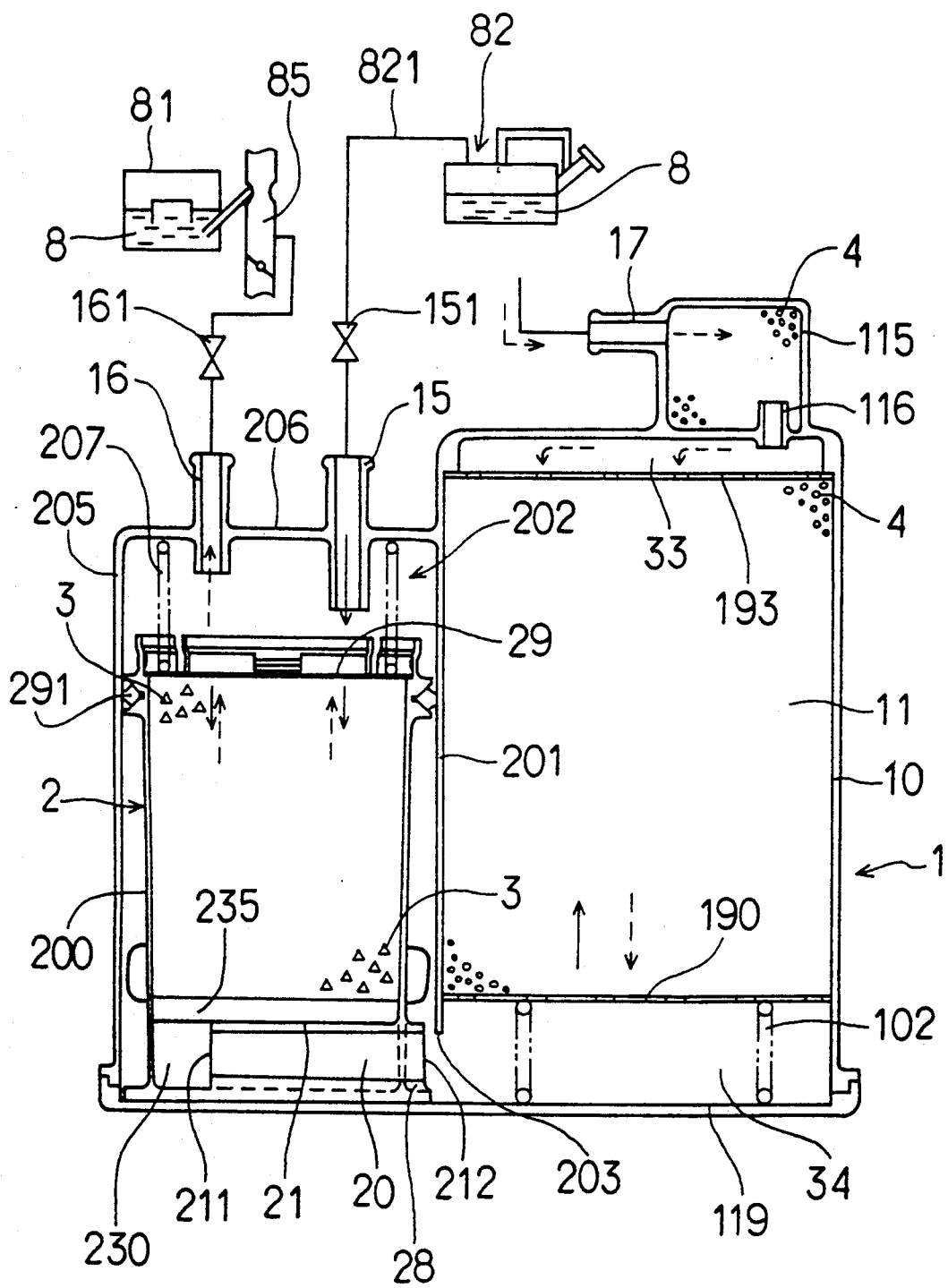
FIG. 8 is a sectional view of an evaporation loss control device of Embodiment 3.

The vapor passage may be formed as a pipe placed within the polymer chamber. The pipe may be so constructed to have its one end as an emission side that opens into the outside of the polymer chamber to communicate with the charcoal chamber as shown in FIG. 8. The other end of the pipe is within the polymer chamber. The fuel vapor that is untrapped in the polymer chamber flows from the emission end into the charcoal chamber.

Figure 12:
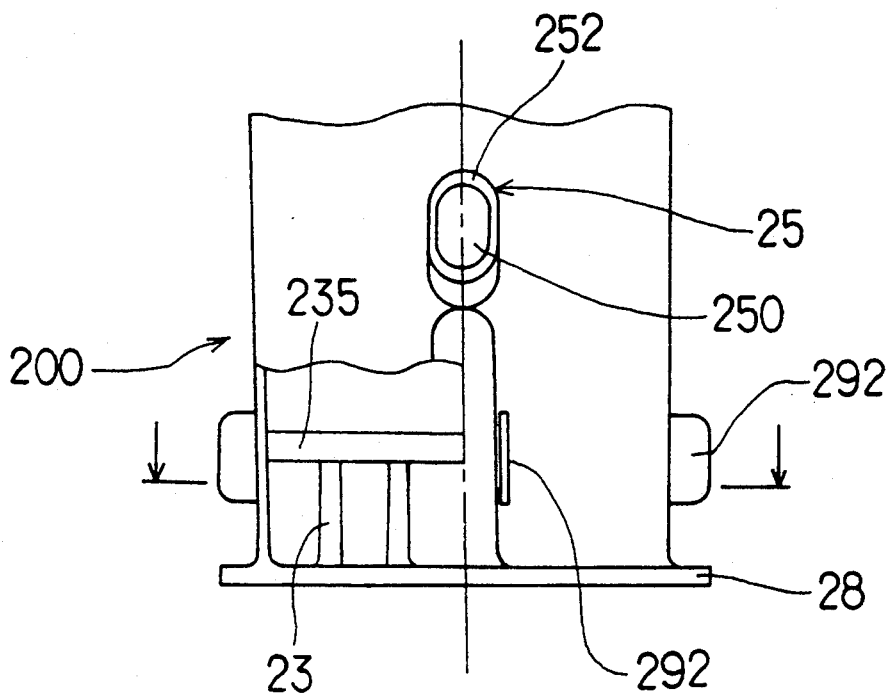
FIG. 12 is a partially sectional view of a polymer chamber of Embodiment 4.

As FIG. 12 shows, the vapor passage may be formed as a sloped pipe from the lower to the upper sides of the polymer chamber. The emission end of the sloped pipe may be opened to the outside of the polymer chamber to communicate with the charcoal chamber.

The sloped pipe has its lower end open into the lower part of the polymer chamber. Its upper emission end opens to the outside of the polymer chamber. The fuel vapor untrapped into the polymer chamber flows into the charcoal chamber from the emission end.

Figure 15:
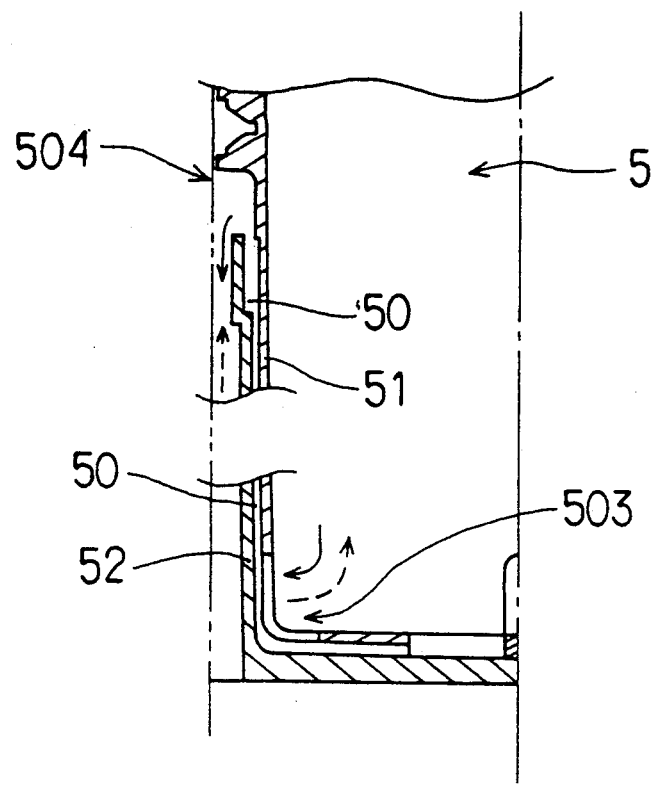
FIG. 15 is a partially sectional view of a polymer chamber of Embodiment 5.

The polymer chamber includes an inner case and an outer case, and a vapor passage is formed therebetween from the lower side of the inner case to the upper side of the outer case. The inlet end of the vapor passage opens into the inner case. The exhaust end of the vapor passage opens to the outside of the outer case. As a result, the polymer chamber may be constructed to communicate with the charcoal chamber as shown in FIG. 15.

In this case, the fuel vapor untrapped in the inner case is exhausted through a substantially long vapor passage formed between the inner and outer cases, and then flows into the charcoal chamber.

Figure 18:
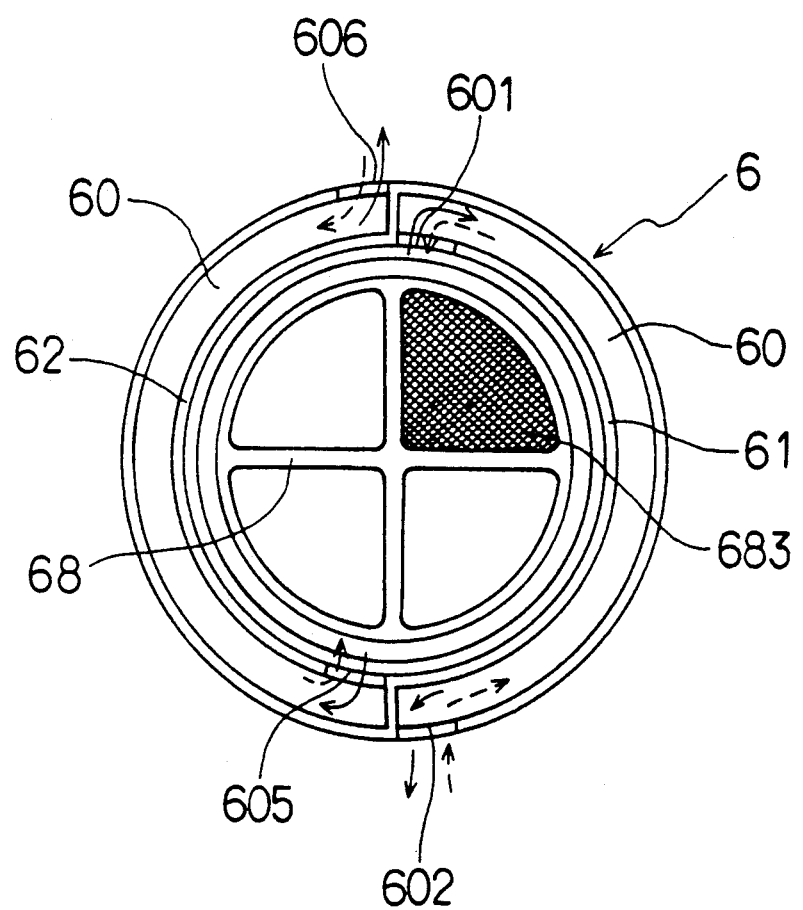
FIG. 18 is a rear elevational view of FIG. 7.

As FIG. 18 shows, two vapor passages may be provided with the bottom of the polymer chamber along the outer contour of the bottom. The exhaust ends open respectively into the outside of the polymer chamber that communicates with the charcoal chamber. In this case, the fuel vapor untrapped by the polymer absorbent is discharged outside the polymer chamber through the vapor passage formed along the outer contour of the polymer chamber bottom and flows into the charcoal chamber.

In the present invention, the evaporated fuel admitted through the introduction pipe is absorbed by the polymer absorbent. Only the evaporated fuel untrapped by the absorbent flows into the charcoal chamber through the vapor passage to be absorbed by the charcoal.

When purging begins, air flows through the charcoal chamber, vapor passage, and the polymer chamber subsequently to desorb the evaporated fuel that has been absorbed by the charcoal and the polymer absorbent. Additionally the air is admitted into the intake side of the engine through the purging pipe together with the desorbed evaporated fuel.

The most salient feature of the present invention is the vapor passage which is provided between the polymer chamber and the charcoal chamber so as to prevent the liquid fuel trapped by the polymer absorbent from flowing into the charcoal chamber when the automobile is at rest.

Since the vapor passage is formed between the polymer and the charcoal chambers, the distance thereof becomes substantially longer than that of the case provided with no vapor passage.

When the fuel is desorbed from the polymer absorbent, the concentration of the fuel vapor within the polymer chamber becomes higher than that within the charcoal chamber. Such a gradient of fuel vapor concentration within both chambers diffuses the fuel vapor into the charcoal chamber to be absorbed by charcoal therein. This is how the fuel trapped by the polymer absorbent flows into the charcoal chamber.

The diffusion speed of the fuel vapor is proportional to the diffusion area, and inversely proportional to the diffusion distance. In the present invention, the diffusion area is reduced and the diffusion distance is increased by forming the vapor passage between the polymer and charcoal chambers. The diffusion speed, thus, is decreased to restrain the fuel vapor trapped in the polymer chamber from flowing into the charcoal chamber as much as possible. The evaporated fuel vapor is thereby prevented from flowing into the charcoal chamber from the polymer chamber, resulting in restraining the decrease in working capacity of the charcoal. Accordingly the working capacity of the charcoal can be maintained.

The fuel vapor trapped as vapor is partially absorbed in the polymer chamber. However, most of such fuel vapor will flow into the charcoal chamber through the polymer chamber and the vapor passage to be absorbed by charcoal. In case the component of the trapped vapor absorbed in the polymer chamber evaporates, it flows into the charcoal chamber to be absorbed therein. This component has a low boiling point, which hardly decreases the working capacity of charcoal. As described above, the liquid component of the evaporated fuel admitted through the introduction pipe (liquid fuel) and the evaporated fuel with a large number of carbon atoms that hardly vaporize are mostly absorbed by the polymer absorbent, and thus, are hardly brought into direct contact with the charcoal.

In the above aspect, the working capacity of the charcoal is not deteriorated. Since the ability of charcoal for trapping vapor can be used to a degree of nearly 100%, it is not necessary to increase the amount of the charcoal to be used, resulting in reducing the size of the evaporation loss control device.

The present invention provides the evaporation loss control device with excellent capability for trapping the evaporated fuel without deteriorating the working capacity of charcoal.

DESCRIPTION OF THE PRESENTLY PREFERRED EXEMPLARY EMBODIMENTS

Embodiment 1

The first embodiment of the present invention of the evaporation loss control device will be described with reference to FIGS. 1 and 2.

The device of this embodiment is intended to be used for automobiles. As FIG. 1 shows, the evaporation loss control device 1 is composed of a charcoal chamber 11 placed in the upper part of a housing tank 10, a polymer chamber 12 placed in the lower part of the housing tank 10, a spiral passage 35 provided for communication therebetween, a plurality of space chambers, an introduction pipe 15 communicating the housing tank 10 and the upper space of a fuel tank 82, and a purging pipe 16 communicating the housing tank 10 and an intake passage of the carburetor 85 of the engine.

The charcoal chamber 11 is filled with charcoal 4. The polymer chamber 12 is filled with a polymer absorbent 3. A first space chamber 3 and a second space chamber 32 are provided as upper and lower parts of the polymer chamber 12, respectively. A third space chamber 33 and fourth space chamber 34 are provided as upper and lower parts of the charcoal chamber 11, respectively. The first and fourth space chambers 31 and 34 are positioned alongside to be divided by a partition wall 311 so as to not communicate with each other.

Figure 2:
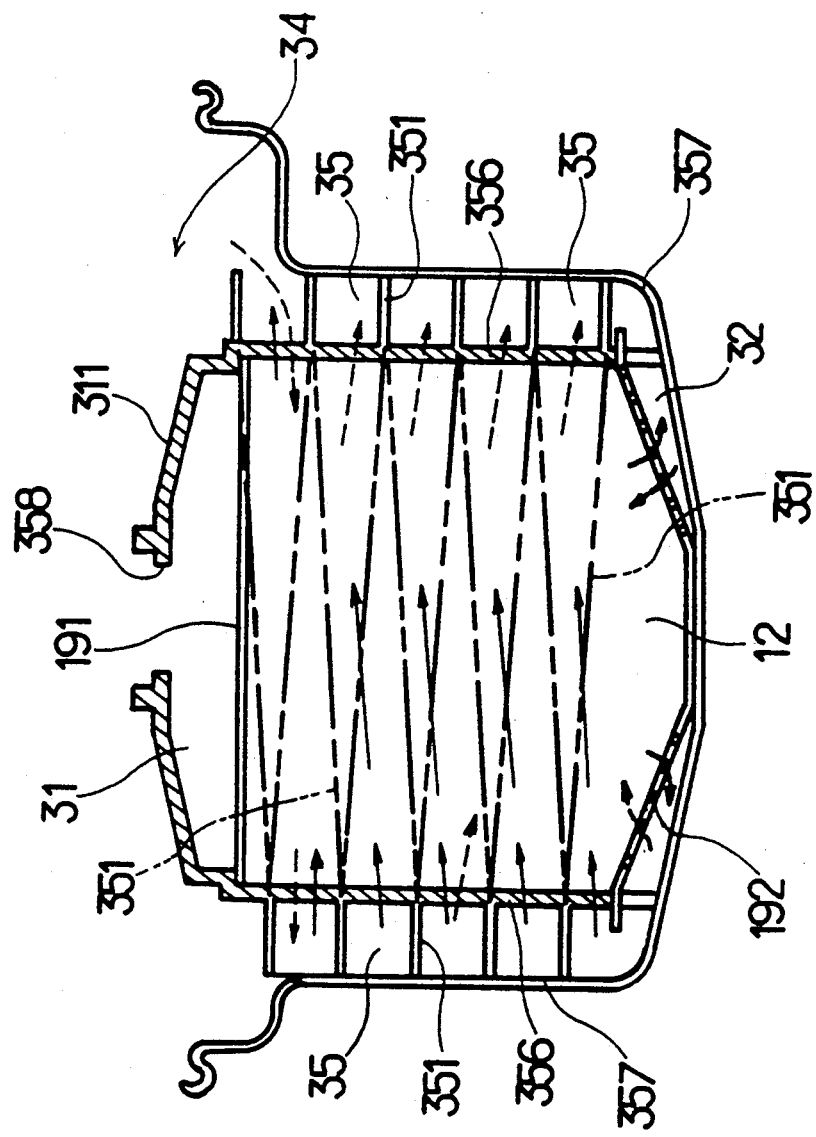
FIG. 2 is an enlarged sectional view of a polymer chamber and a spiral passage of Embodiment 1.

As FIG. 2 shows, a clearance is formed along the whole periphery between the outer wall 356 of the polymer chamber 12 and the outer wall 357 of the housing tank 10. A passage wall 351 is provided to form the spiral passage 35 in the clearance along the outer periphery of the outer wall 356 of the polymer chamber 12. The bottom of the spiral passage 35 communicates with the second space chamber 32, and the top thereof communicates with the fourth space chamber 34.

Figure 1:
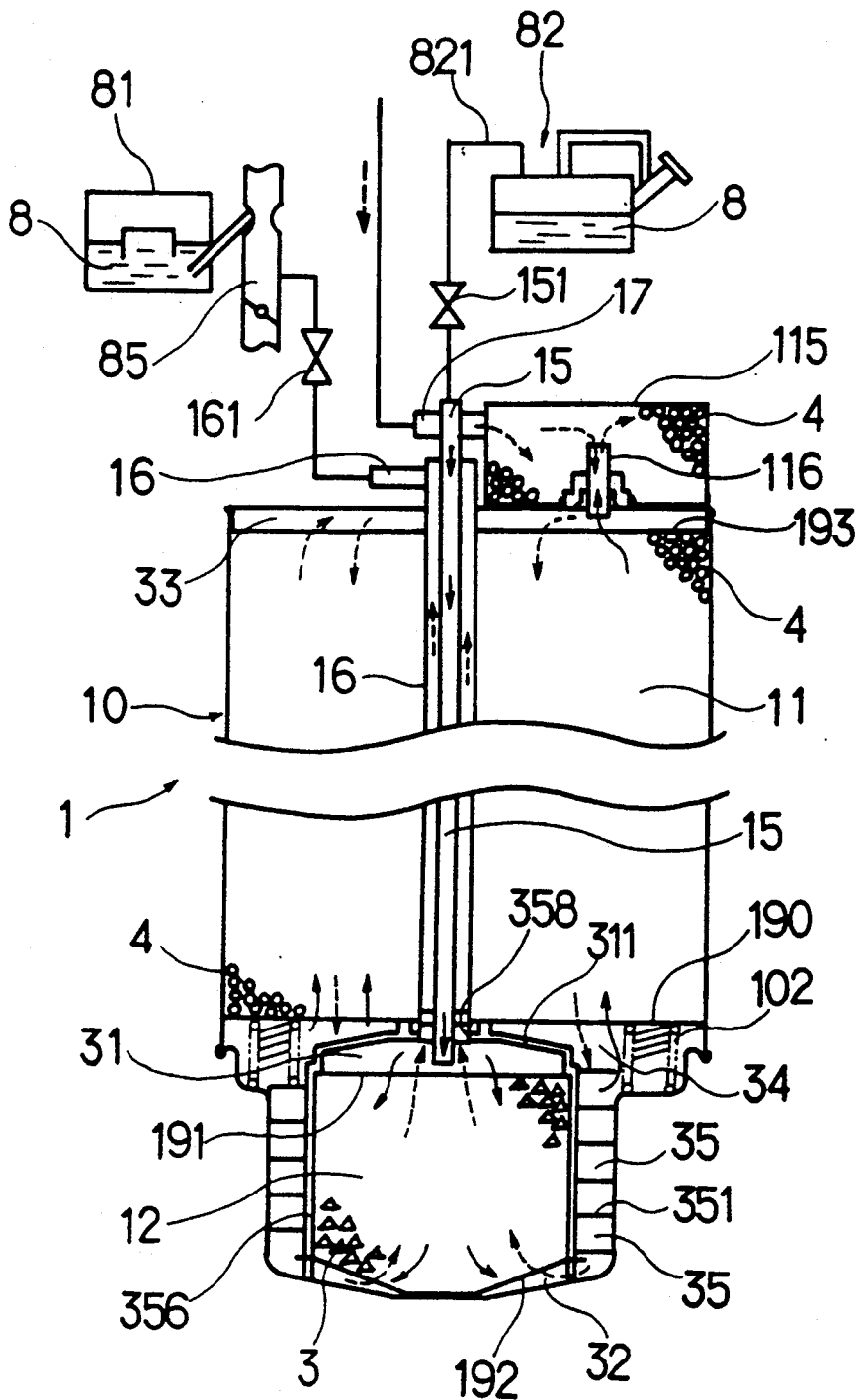
FIG. 1 is a sectional view of an evaporation loss control device of Embodiment 1.

As FIG. 1 shows, the introduction pipe 15 connected to the fuel tank 82 and purging pipe 16 connected to the intake passage of the carburetor 85 enters into the upper end of the housing tank 10 to pass through the third space chamber 33, charcoal chamber 11, and the fourth space chamber 34, and are inserted into the open hole 358 formed in the center part of the partition wall 311. The introduction pipe 15 and the purging pipe 16 open into the first space chamber 31.

In this embodiment, the purging pipe 16 is designed to encircle the introduction pipe 15 therein, as double piping, to open into the first space chamber 31. A buffer canister 115 with relatively small capacity is provided on the third space chamber 33, the buffer canister 115 being filled with charcoal 4. The third space chamber 33 communicates with the buffer canister 115 through communication pipe 116.

An air pipe 17 for ventilation is provided with the buffer canister 115. The housing tank 10 communicates with the atmosphere through the air pipe 17, buffer canister 115, and the communication pipe 116. The buffer canister 115, as a subcanister, functions to prevent the evaporated fuel stored in the housing tank 10 from releasing into the atmosphere. An appropriate liquid fuel dispersion member is preferably provided in the vicinity of the lower open end of the introduction pipe 15 in the first space chamber 31. By this, the liquid fuel flowing down through the introduction pipe 15 is brought into contact with the polymer absorbent within the polymer chamber 12.

A cellular wall 190 is provided as a partition between the charcoal chamber 11 and the fourth space chamber 34. A cellular wall 191 forms a partition between the first space chamber 31 and the polymer chamber 12, a cellular wall 192 forms a partition between the second space chamber 32 and the polymer chamber 12. A cellular wall 193 is provided as a partition between the third space chamber 33 and the charcoal chamber 11. The cellular walls 190, 191, 192, and 193 may be formed of any material, for example, metal gauze or cellular plate, which to divides the respective chambers and allows the evaporated fuel and the air during purging to pass easily therethrough and prevents the charcoal and the polymer absorbent from leaking out of their respective chambers.

The upper base end of the introduction pipe 15 upwardly communicates with the fuel tank 82 via a valve 151. The upper base end of the purging pipe 16 communicates with the carburetor 85 of the intake side of the engine via a valve 161. The carburetor 85 is connected to a flat chamber 81. Reference numerals 8 and 102 respectively designate gasoline fuel, and a spring coil which supports the cellular wall 190.

The polymer absorbent may be selected as a single material or the combination of two or more materials selected from polypropylene, polyisoprene, polybutadiene, polyisobutylene, polystyrene, poly-norbornene, polydimethyl siloxane, ethylene-propylene-diene copolymer, styrene-butadiene copolymer, ethylene-propylene copolymer, isobutylene-isoprene copolymer, and butadiene-acrylonitrile copolymer.

The polymer absorbent may be selected from uncrosslinked polymer and crosslinked polymer (polymer gel). The uncrosslinked polymer is generally called a hydrophobic polymer that dissolves or swells in the fuel, for example, polyisoprene as a homopolymer, and styrenebutadiene copolymer as a copolymer.

The polymer gel is obtained through crosslinking the hydrophobic polymer as described above. The polymer gel becomes insoluble as a result of the crosslinking, however, it can still swell in the fuel. Accordingly, crosslinking includes not only chemical ones using a crosslinking agent, but also chemical self-crosslinking or physical crosslinking.

The polymer absorbent may be formed in the form of a powder, particles, a film, floss, honeycomb, plate, etc. provided that the absorbent has excellent absorption and purging abilities. The absorbent floss with a length in the range of from about 10 mm to about 50 mm obtained by adhering the polymer gel to fibers has excellent absorption and purging abilities. When using substantially large clots of the polymer absorbent, its surface part only swells to retard the absorption to the inside, deteriorating its absorption ability. The absorbent, thus, preferably has its diameter or thickness of 5 mm or less.

The polymer absorbent that has been swollen by absorbing the evaporated fuel is contracted in the normal course of purging within the evaporation loss control device. Its absorption capacity, thus, is restored to be used again.

The charcoal may be steam activated charcoal or granular charcoal normally used in the conventional evaporation loss control device.

The evaporated fuel within the fuel tank 82 flows into the introduction pipe 15 through the connection pipe 821, then falls down into the first space chamber 31 from the bottom end of the introduction pipe 15. The evaporated fuel then flows into the polymer chamber 12 through the cellular wall 191 so as to be absorbed by the polymer absorbent 3.

The fuel vapor, being the gas component untrapped by the polymer absorbent 3 in the polymer chamber 12 flows into the second space chamber 32. The fuel vapor then flows upwardly through the long spiral passage 35 as the vapor passes into the fourth space chamber 34. Finally the vapor flows into the charcoal chamber 11 to be absorbed by the charcoal 4. The flow of the evaporated fuel in the evaporation loss control device is shown by a solid arrow marked in FIG. 1.

The most important feature of the device is to provide the spiral passage 35 as a vapor passage between the second space chamber 32 and the fourth space chamber 34. The spiral passage 35 prevents the evaporated fuel absorbed by the polymer absorbent from flowing up into the charcoal chamber 11 when the automobile is at rest.

Since the spiral passage 35 is provided to encircle the polymer chamber 12, the distance from the second space chamber 32 to the fourth space chamber 34 is substantially longer than in a device with no spiral passage 35. The evaporated fuel desorbed from the polymer absorbent 3 reaches the charcoal chamber 11 by passing through the distance of the spiral passage 35.

Since the evaporated fuel partially resides within the spiral passage 35 as it flows therethrough, only a small amount of the evaporated fuel flows into the charcoal chamber 1, thus maintaining the working capacity of the charcoal. Since the polymer chamber 12 is encircled by the spiral passage 35, it is not affected by increases of the outside temperature, thereby preventing evaporation of the fuel absorbed within the polymer chamber 12.

The dotted arrow drawn in FIG. 1 shows, when purging begins, that air is admitted by negative pressure in the carburetor 85 into a third space chamber 33 through the air pipe 17 by passing through the buffer canister 115 and the communication pipe 116. The air then flows from the third space chamber 33 into the charcoal chamber 11 through the cellular wall 193 to desorb the evaporated fuel absorbed by the charcoal 4.

The air flows into the polymer chamber 12 through the cellular wall 190, the fourth space chamber 34, spiral passage 35, the second space chamber 32, and the cellular wall 192 to desorb the evaporated fuel absorbed by the polymer absorbent 3. The air containing desorbed evaporated fuel flows into the first space chamber 31 and enters the carburetor 85 through the purging pipe 16 to be fed to the engine.

As described above, according to this embodiment, the evaporated fuel admitted into the first space chamber 31 has its liquid component and partial gas component absorbed by the polymer absorbent 3. The evaporated fuel of the gas component, which is untrapped by the polymer absorbent 3, i.e., the fuel vapor, is brought in contact with charcoal to be absorbed thereby. The evaporated fuel of the gas component caused by gas leaking from the polymer absorbent 3 into the second space chamber 32 flows into the charcoal chamber 1 by passing through the spiral passage 35 to the fourth space chamber 34. Thus only a small amount of the evaporated fuel flows into the charcoal chamber 11, maintaining the absorption ability of the charcoal. Since the working capacity of the charcoal can be used to a degree of nearly 100%, only a small quantity thereof is required, resulting in downsizing the device. The introduction pipe 15 is inserted in the purging pipe 16 so that they are communicated with the first space chamber 31 through only one point, resulting in easy sealing.

The polymer absorbent in the polymer chamber 12 absorbs the evaporated fuel as liquid component or the fuel which hardly evaporates due to a large number of carbon atoms.

Since the polymer chamber 12 is encircled by the spiral passage 35, the first space chamber 31 and the second space chamber 32, it is not affected from the increase of the outside temperature, thus preventing the fuel absorbed therein from evaporating.

The polymer absorbent that has been swollen from absorbing the evaporated fuel is subjected to desorption by purging, thus restoring its working capacity to be continuously usable.

Embodiment 2

Figure 3:
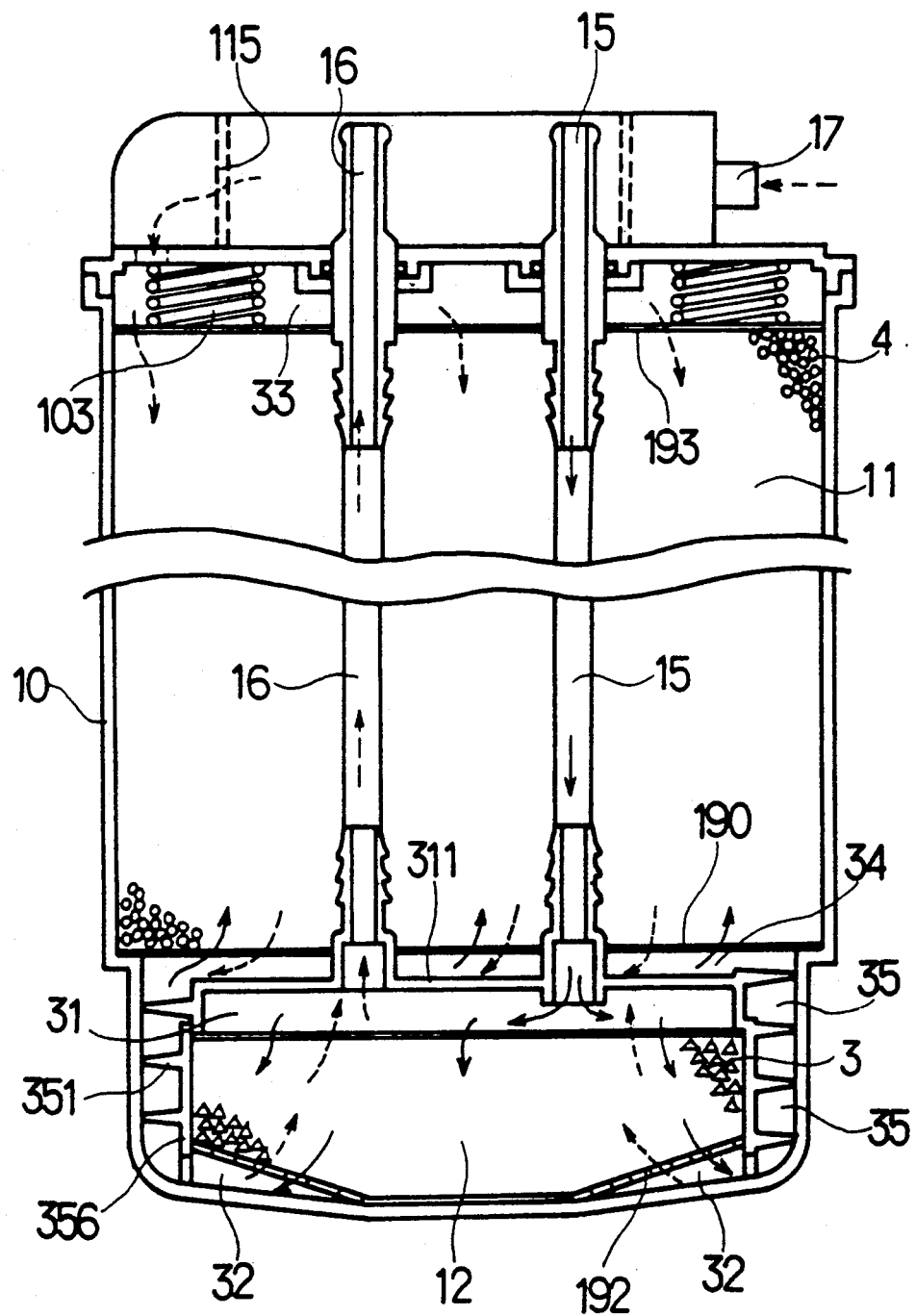
FIG. 3 is a sectional view of an evaporation loss control device of Embodiment 2.
Figure 4:
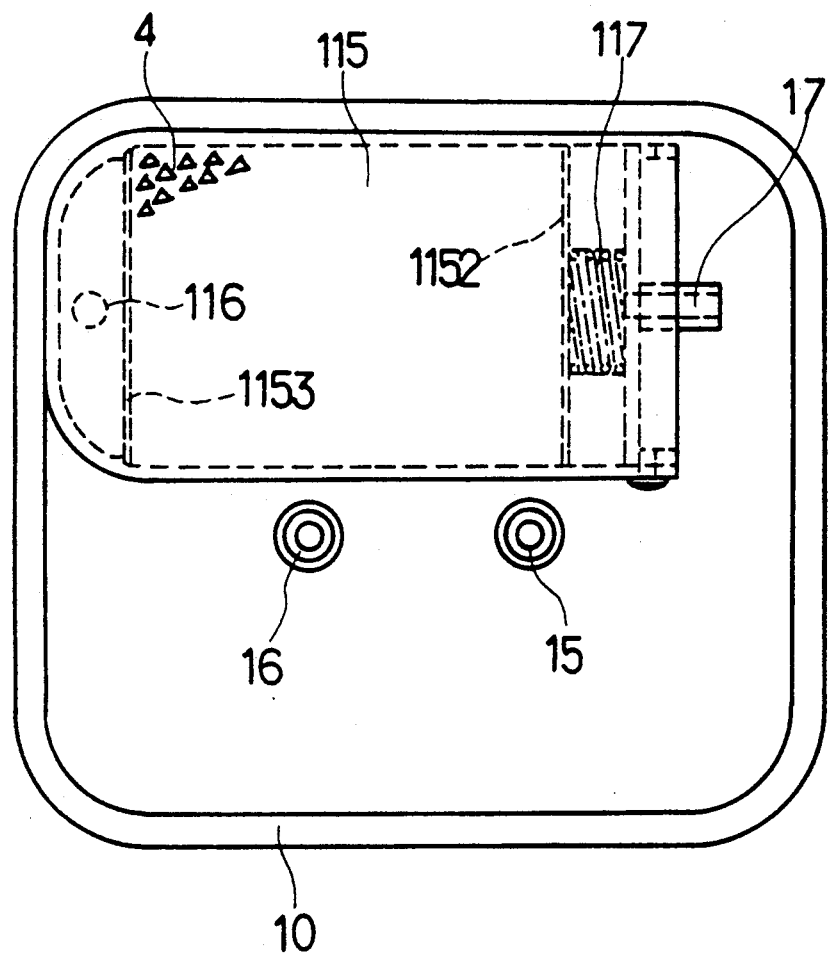
FIG. 4 is a plan view of the evaporation loss control device of Embodiment 2.

As FIGS. 3 and 4 show, the second embodiment of the present invention has an introduction pipe 15 and a purging pipe 16 separately opened into the first space chamber 31. A spring coil 103 is provided in the third space chamber 33 to apply pressure force to the cellular wall 193 in direction of the charcoal 4 so as to keep the charcoal in place.

As FIG. 4 shows, plates 1152 and 1153, and a spring coil 117 are provided in the buffer canister 115 for pressing the charcoal therein. Other features are the same as those of Embodiment 1. According to this embodiment, the same effect as of Embodiment 1 can be obtained.

Experimental Results

Figure 5:
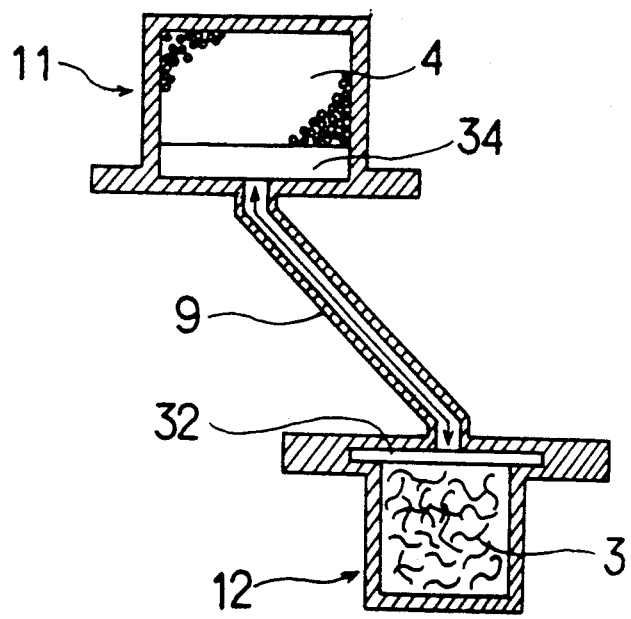
FIG. 5 is an explanatory view of a device used for the experiment.
Figure 6:
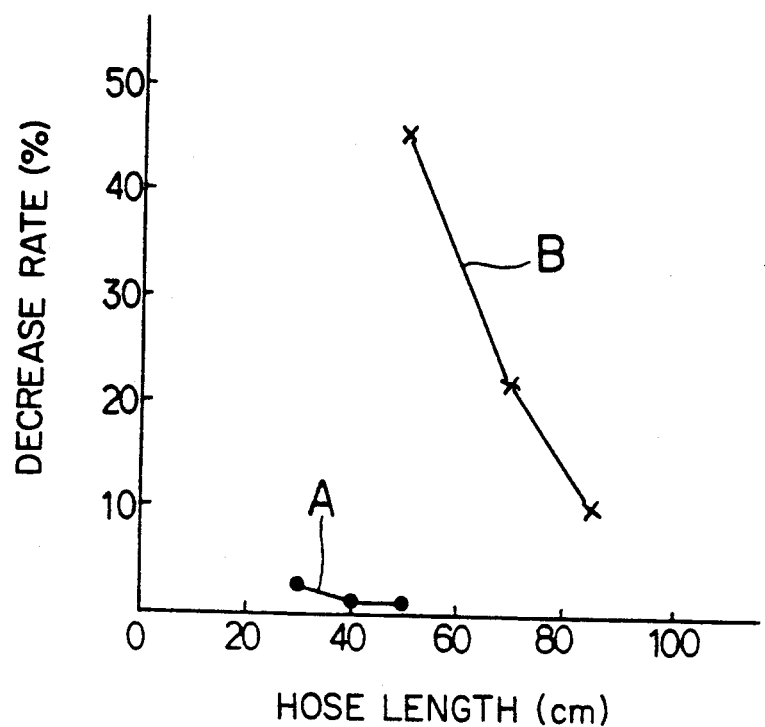
FIG. 6 is a graph showing the relationship between hose length and decrease rate as experimental results.
Figure 7:
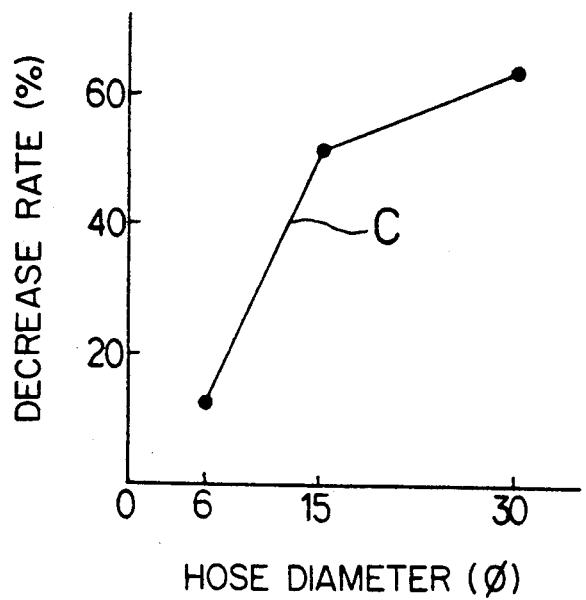
FIG. 7 is a graph showing the relationship between hose diameter and decrease rate as experimental results.

FIGS. 5, 6 and 7 show the results of the experiments concerning the effect obtained from providing the vapor passage formed in the evaporation loss control device of the present invention.

The experiment was carried out using the device as shown in FIG. 5. The device was composed of a charcoal chamber 11 filled with charcoal 4, a polymer chamber 12 filled with polymer absorbent 3, and a hose 9 connecting both chambers 11 and 12. The hose 9 served as the vapor passage of the present invention. A fourth space chamber 34 was provided between the bottom of the charcoal chamber 11 and the hose 9. A second space chamber 32 was provided between the upper part of the polymer chamber 12 and the hose 9. The fluid fuel or single constituent part thereof was absorbed by the polymer absorbent 3.

The weights of the polymer absorbent 3 before and after being left for 15 hours at room temperature were measured. The diameter (inner diameter), and length of the hose were respectively varied for measurement. FIGS. 6 and 7 show the experimental results. FIG. 6 shows the relationship between the hose length and the decrease rate (100%) (Difference of weights of the polymer absorbent before and after being left/weight of the polymer absorbent before being left $\times$ 100) with respect to A (hose diameter: 6 mm) and B (hose diameter:19 mm). The graph shows that the smaller the decrease rate becomes, the less the fuel flow into the charcoal chamber 11.

FIG. 7 line C shows the relationship between the hose diameter and the decrease rate in case the hose length is 1 cm. As shown in FIGS. 6 and 7, when the passage diameter (inner diameter) of the hose 9 becomes smaller, and the length of the hose 9 becomes longer, the decrease rate of the polymer absorbent becomes smaller, which implies that the absorbed evaporated fuel is efficiently trapped.

Embodiment 3

Figure 9:
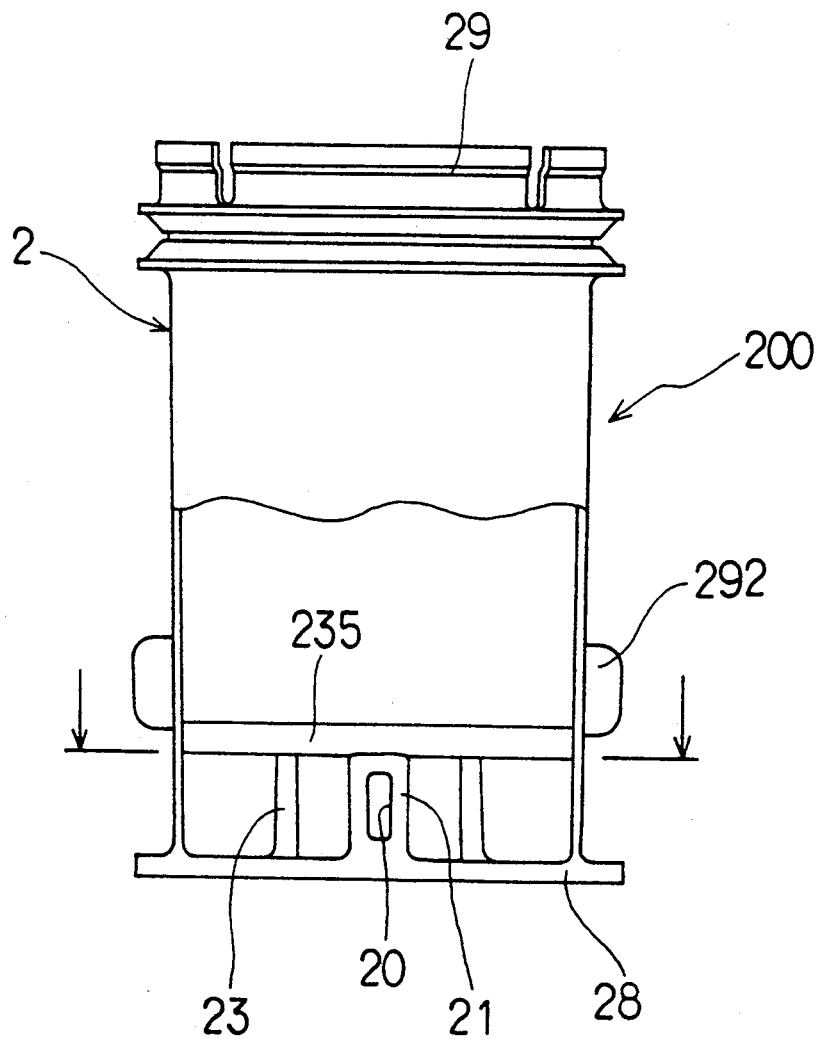
FIG. 9 is a partially sectional view of a polymer chamber of Embodiment 3.
Figure 10:
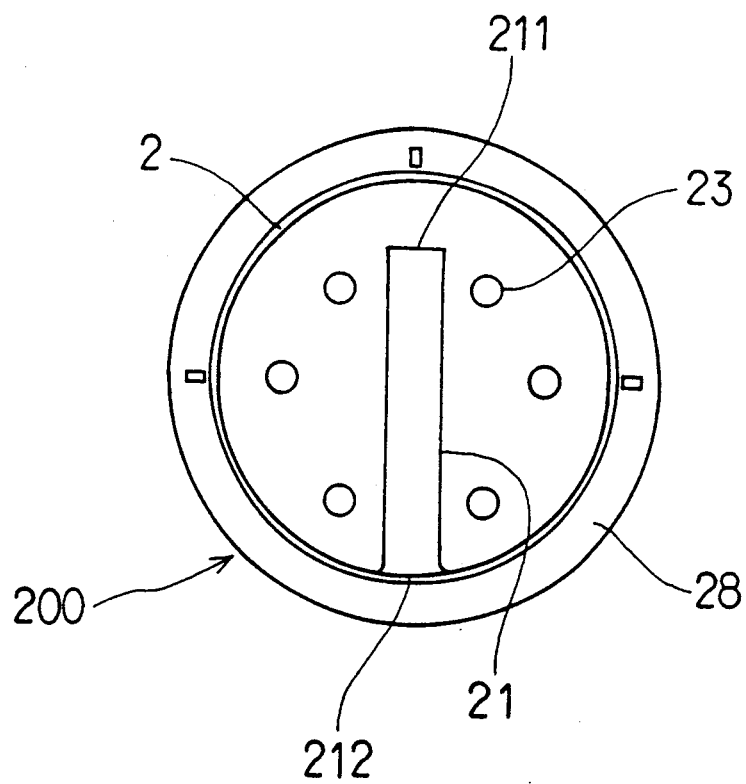
FIG. 10 is a sectional view taken on line A—A of FIG. 9.

As FIGS. 8, 9 and 10 show, the third embodiment of the present invention has a charcoal chamber 11 and a polymer chamber 2 closely placed with respect to one another and an inner pipe 21 provided within the polymer chamber 2 to form a vapor passage 20. As FIG. 8 shows, the evaporation loss control device has a partition wall 201 provided with the side surface of the charcoal chamber 11, and housing 202 enclosing a tubular case 200 forming the polymer chamber 2 therein. The polymer chamber 2 is filled with the polymer absorbent 3 and has the inner pipe 21 which is horizontally formed therein. The inner pipe 21 serves as the vapor passage 20 to prevent the trapped liquid fuel from flowing therethrough, while allowing the trapped fuel vapor to pass therethrough. The inner pipe 21 has a bottom plate 28 at its bottom. The inner pipe 21 extending in a direction of the diameter of the polymer chamber 2 has an exhaust end 212 on its one end which opens into an open end 203 of the bottom part of the charcoal chamber 11. The other end, i.e., an inlet end 211 opens to the innermost part of the polymer chamber 2. A space chamber 230 is provided in front part of the inlet end 211.

The case 200 has a screen lid 29 on its top and a guide fins 292 on its side, and a sealing member 291 between the partition wall 201 and an outside wall 205 at an upper part thereof. Spring coils 207 are provided between the screen lid 29 and a top panel 206 of the housing 202 so as to hold the case 200 in place. The purging pipe 16 and the introduction pipe 15 are connected to the top panel 206.

The charcoal chamber 11 is formed in a housing tank 10, and has a buffer canister 115 placed thereon which is the same as that of Embodiment 1. A space chamber 230 is provided so that purging air is ventilated uniformly to the polymer absorbent 3 from lower part thereof. A permeable unwoven cloth 235 is set on a rod 23 so as to prevent the polymer absorbent 3 from falling down into the space chamber 230.

Other features of this embodiment are the same as those of Embodiment 1.

The evaporated fuel in the fuel tank 82 is admitted into the housing 202 through the introduction pipe 15 in the same way as in Embodiment 1. It flows into the polymer chamber 2 through the screen lid 29 to be absorbed by the polymer absorbent 3 in the polymer chamber 2.

The fuel vapor untrapped by the absorbent 3 flows from the polymer chamber 2 into the fourth space chamber 34 under the charcoal chamber 11 through the vapor passage 20 of the inner pipe 21 and the opening 203 formed at the bottom of the charcoal chamber 11. It further flows up into the charcoal chamber 11 through the cellular wall 190 to be absorbed by the charcoal 4 therein as routed by a solid arrow in FIG. 8.

The most important feature of the embodiment is to provide the vapor passage 20 by using the inner pipe 21 between the polymer chamber 2 and the fourth space chamber 34. The vapor passage 20 serves to prevent the evaporated fuel absorbed by the polymer absorbent 3 from flowing into the charcoal chamber 11 when the automobile is at rest. This effect is the same as that obtained in Embodiment 1.

The dotted arrow in FIG. 8 shows that when purging begins due to negative pressure in the carburetor 85, air flows into the polymer chamber 2 through the air pipe 17 via the buffer canister 115, charcoal chamber 11, the fourth space chamber 34, and the inner pipe 21. In the course of the above flow, the air is absorbed by the charcoal 4 and the polymer absorbent 3 to desorb the evaporated fuel. The air further flows into the carburetor 85 through the purging pipe 16 on the top of the housing 202 in the same way as in Embodiment 1. This effect is also the same as that obtained in Embodiment 1.

Embodiment 4

Figure 11:
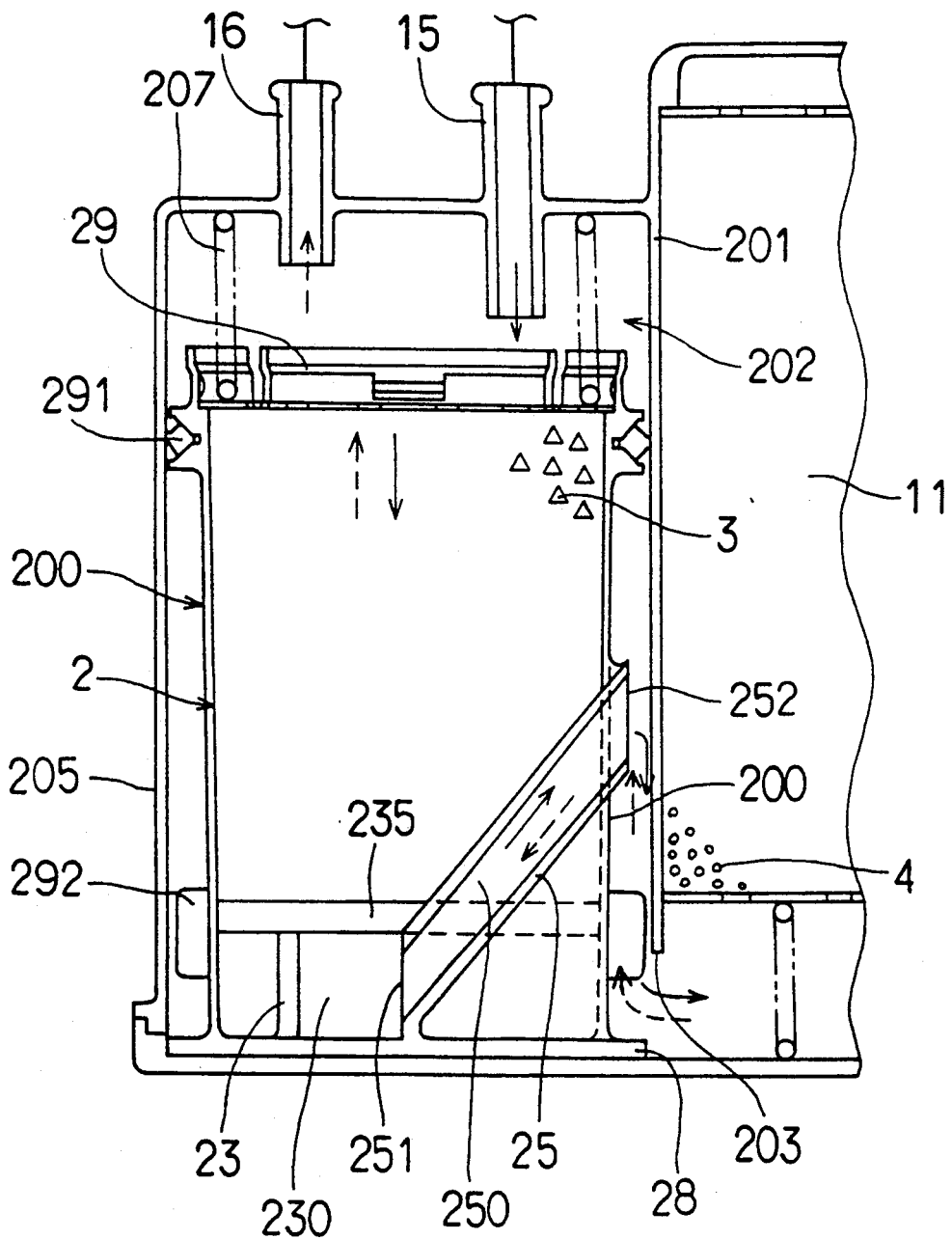
FIG. 11 is a sectional view of an evaporation loss control device of Embodiment 4.
Figure 13:
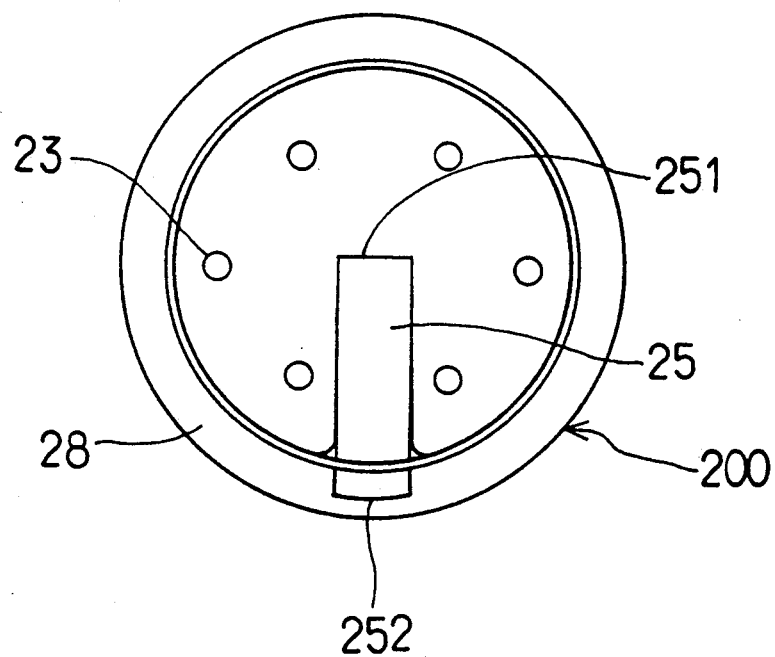
FIG. 13 is a sectional view taken on line B—B of FIG. 12.

As FIGS. 11, 12 and 13 show, the evaporation loss control device of this embodiment has a slant pipe 25 in the polymer chamber 2 forming a vapor passage 250 therein. The slant pipe 25 is provided so as to slant from a bottom plate 28 of the polymer chamber 2 to half the height of the case 200. The slant pipe 25 has an inlet opening 251 on its lower end, an exhaust opening 252 on its upper end, and the vapor passage 250 formed therebetween. Other features are the same as those of Embodiment 3. In this embodiment, since the slant pipe 25 is slanted, the vapor passage is made substantially longer. Even though large amounts of liquid fuel might flow into the polymer chamber 2 in excess of working capacity of the polymer absorbent 3, the exhaust opening 252 provided with upper part of the slant pipe 25 will prevent the liquid fuel from flowing up into the charcoal chamber. The effects obtained in this embodiment are the same as those of Embodiment 3.

Embodiment 5

Figure 14:
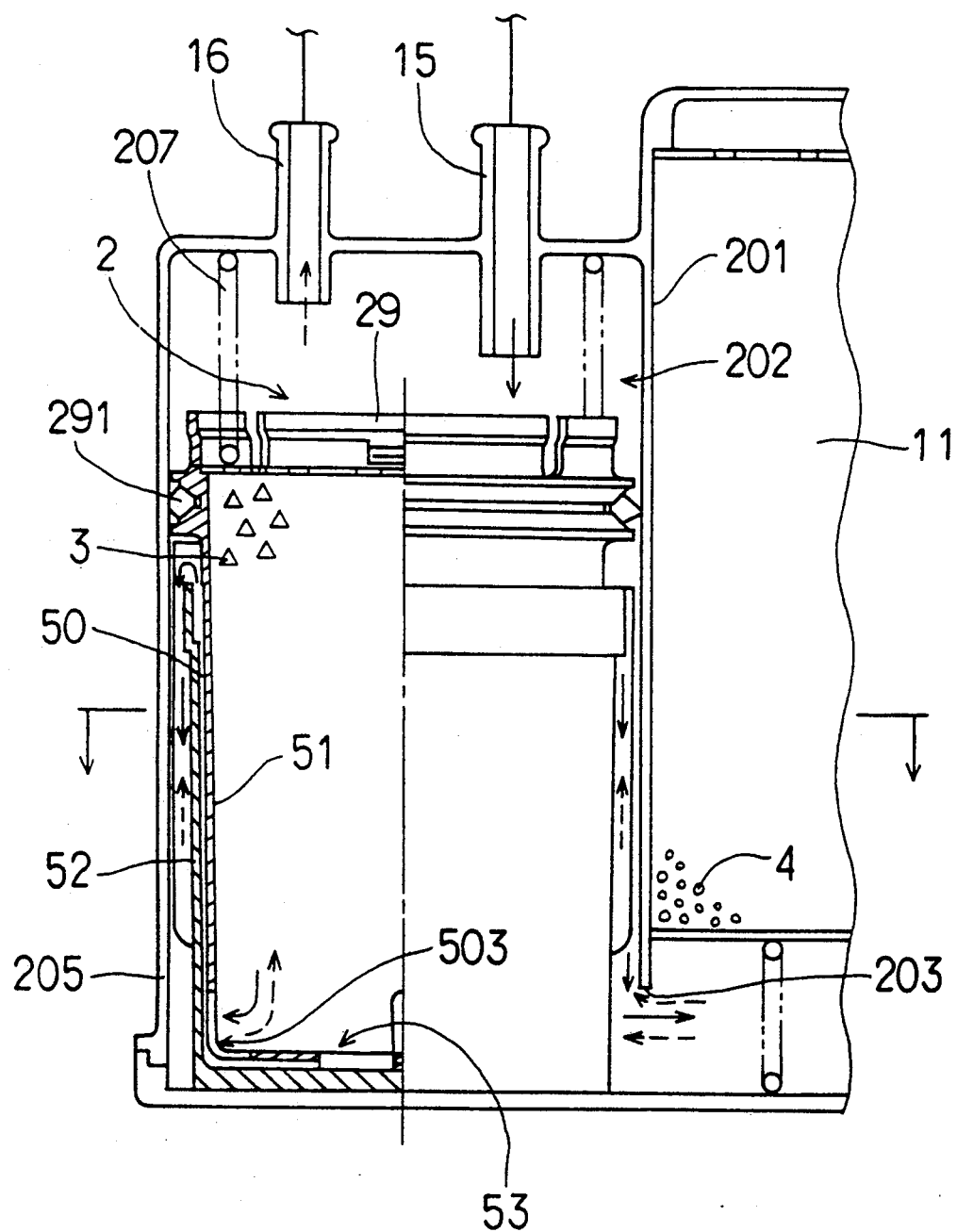
FIG. 14 is a sectional view of an evaporation loss control device of Embodiment 5.
Figure 16:
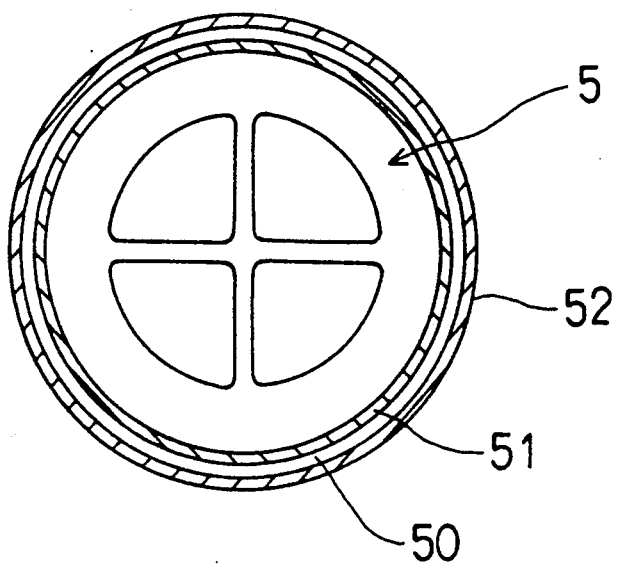
FIG. 16 is a sectional view taken on line C—C of FIG. 14.

As FIGS. 14, 15 and 16 show, this embodiment has a polymer chamber 2 composed of an inner case 51 and an outer case 52, and a vapor passage 50 formed therebetween.

The inner case 51 is formed in the outer case 52. The vapor passage 50 is formed between the outer wall surface of the inner case 51 and the inner wall surface of the outer case 52. The vapor passage 50 has an inlet opening 503 formed at the lower part of the inner case 51, and an exhaust opening 504 formed at the upper part of the outer case 52 as FIG. 16 shows.

In this embodiment, the device is so constructed to allow the fuel vapor or purging air to pass through the vapor passage 50 formed between the inner case 51 and the outer case 52. Other features are the same as those of Embodiment 3.

Embodiment 6

Figure 17:
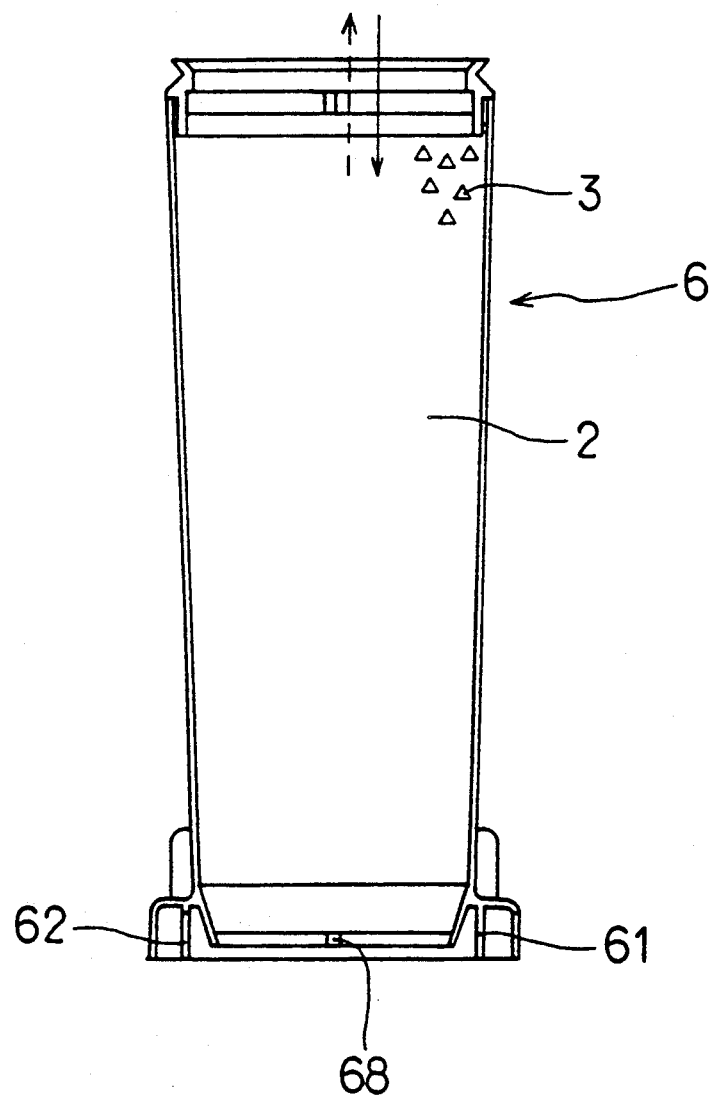
FIG. 17 is a sectional view of an evaporation loss control device of Embodiment 6.

As FIGS. 17 and 18 show, the evaporation loss control device of this embodiment has two vapor passages 60 in semi-circular shape formed at the bottom of the polymer chamber 2 along the contour thereof.

The polymer chamber 2 is formed in a tubular case 6 which is the same as the case 200 of Embodiment 3. As FIG. 18 shows, the semi-circular vapor passages 60 are formed of the semi-circular partition walls 61 and 62, respectively at outer periphery of a bottom plate 68. The vapor passages 60 have the inlet opening and exhaust opening designated by reference numerals of 601 and 602, and 605 and 606, respectively. The bottom plate 68 is provided With a screen 683. The case 6 is housed within the housing 202 (See FIG. 8) in the same way as the case 200 of Embodiment 3. In this embodiment, the evaporation loss control device is so constructed to allow the fuel vapor and purging air to pass through the vapor passages 60 in the same way as in Embodiment 3. The effects obtained in this embodiment are the same as those of Embodiment 3.

While the invention has been described with reference to the embodiments, it is to be understood that modifications or variations may be easily made by a person of ordinary skill in the art without departing from the scope of this invention which is defined by the appended claims.

What is claimed is:

1. An evaporation loss control device comprising:
    a polymer chamber filled with polymer absorbent,
    a charcoal chamber filled with charcoal, said charcoal chamber communicating with said polymer chamber,
    an introduction pipe for introducing evaporated fuel, the introduction pipe allowing a fuel tank to communicate with said polymer chamber, a purging pipe for purging said evaporated fuel, said purging pipe being adapted to connect to an engine intake passage with said polymer chamber, and a pipe for air ventilating provided on said charcoal chamber, a vapor passage formed between said polymer chamber and said charcoal chamber, said vapor passage having a length and orientation such that trapped liquid fuel is shut off, while trapped fuel vapor passes therethrough.

2. The device as claimed in claim 1, wherein said vapor passage is a spiral passage encircling an outer periphery of said polymer chamber.

3. The device as claimed in claim 1, wherein said vapor passage is an inner pipe provided in said polymer chamber with its exhaust end opened into said charcoal chamber.

4. The device as claimed in claim 1, wherein said vapor passage is a slant pipe upwardly slanting and provided in said polymer chamber with an upper exhaust end thereof opening into said charcoal chamber.

5. The device as claimed in claim 1, wherein said polymer chamber includes an inner case and an outer case such as that said vapor passage is disposed between a bottom of said inner case and a top of said outer case so that an inlet end of said vapor passage opens to an inside of said inner case, and an exhaust end of said vapor passage opens outside of said outer case, thereby communicating with said charcoal chamber.

6. The device as claimed in claim 1, wherein a pair of said vapor passages are disposed at a bottom of said polymer chamber along contours thereof so that exhaust ends open outside of said polymer chamber and communicate with said charcoal chamber.

7. The device as claimed in claim 1, wherein said polymer chamber is disposed under said charcoal chamber.

8. The device as claimed in claim 7, wherein said introduction and purging pipes communicate with said polymer chamber through said charcoal chamber.

9. The device as claimed in claim 8, wherein said introduction pipe is inserted in said purging pipe.

10. The device as claimed in claim 1, wherein said polymer chamber is formed in a tubular case, and said vapor passage is provided therein.

11. The device as claimed in claim 10, wherein said tubular case is placed in a housing provided alongside said charcoal chamber, said housing and said charcoal chamber being divided by a partition wall having an opening provided at the bottom of said partition wall that allows said housing and said charcoal chamber to communicate with one another.

* * * * *